(12) United States Patent
Hoff et al.

(10) Patent No.: US 7,129,676 B2
(45) Date of Patent: Oct. 31, 2006

(54) CONTROLLING RE-CHARGE OF A NICKEL METAL-HYDRIDE (NIMH) OR NICKEL CADMUIM (NICD) BATTERY

(75) Inventors: C. Michael Hoff, Boxborough, MA (US); James E. Nelson, Salem, NH (US)

(73) Assignee: American Power Conversion, West Kingston, RI (US)

( * ) Notice: Subject to any disclaimer, the term of this patent is extended or adjusted under 35 U.S.C. 154(b) by 0 days.

(21) Appl. No.: 10/639,819

(22) Filed: Aug. 13, 2003

(65) Prior Publication Data

US 2004/0135551 A1    Jul. 15, 2004

Related U.S. Application Data

(63) Continuation-in-part of application No. 09/838,753, filed on Apr. 19, 2001, now abandoned.

(51) Int. Cl.
*H01M 10/44* (2006.01)
(52) U.S. Cl. ..................................... 320/150
(58) Field of Classification Search ............... 320/150, 320/153, 154
See application file for complete search history.

(56) References Cited

U.S. PATENT DOCUMENTS

| | | | |
|---|---|---|---|
| 4,816,737 A * | 3/1989 | Delmas et al. ............... | 320/150 |
| 5,103,156 A * | 4/1992 | Jones et al. .................. | 320/150 |
| 5,652,500 A * | 7/1997 | Kadouchi et al. ........... | 320/150 |
| 5,828,203 A * | 10/1998 | Lindeboom et al. ........ | 320/150 |
| 5,912,547 A * | 6/1999 | Grabon ....................... | 320/150 |
| 6,160,383 A * | 12/2000 | Carkner ....................... | 320/150 |
| 6,278,260 B1 * | 8/2001 | Yang ........................... | 320/150 |
| 6,784,642 B1 * | 8/2004 | Yugo et al. .................. | 320/150 |

* cited by examiner

*Primary Examiner*—Edward H. Tso
(74) *Attorney, Agent, or Firm*—Mintz, Levin, Cohn, Ferris, Glovsky and Popeo, P.C.; A. Jason Mirabito, Esq.; Alison L. McCarthy, Esq.

(57) ABSTRACT

A method of charging a NiMH or NiCd battery such that charging does not occupy a substantial amount of time and such that the operating temperature of the battery is reduced during the lifetime of the battery, thereby extending the life of the battery. This invention is a method of charging that is accomplished using a temperature differential method to continuously regulate the rate of charge injected into the battery. An amplifier is used to amplify the difference in temperature between one or more cases in which the battery is contained and ambient temperature. In this method, the greater the difference in temperature, the lower the charging current is injected into the battery. The method of charging may be incorporated into uninterruptible power supply equipment.

2 Claims, 4 Drawing Sheets

CONTROLLING RE-CHARGE OF A NICKEL METAL-HYDRIDE (NIMH) OR NICKEL CADMUIM (NICD) BATTERY

CLAIM OF PRIORITY TO PRIOR APPLICATIONS

This application is a continuation in part of U.S. patent application Ser. No. 09/838,753, filed Apr. 19, 2001 now abandoned, the disclosure of which is incorporated herein by reference.

FIELD OF THE INVENTION

The present application relates generally to a system containing rechargeable batteries and a method for recharging them when they become discharged. More specifically, the present application relates to a novel method of recharging NiMH and NiCd Batteries and maintaining their state of charge between discharges. Such batteries may be incorporated into an uninterruptible power supply (UPS) to ensure power availability for critical and/or sensitive loads, as disclosed with respect to NiMH batteries in application Ser. No. 09/838,753.

BACKGROUND OF THE INVENTION

When a NiCd battery or NiMH battery is fully charged, any additional charge current is converted to heat within the cell and needs to be dissipated in order to keep reduce the damaging effects of high temperature on the battery's service life. The most common method found in many low cost chargers is to inject current into the battery(s) at a very low rate. The benefit of this method is that once the battery is fully charged, the minimal amount of heat generated by the continuous overcharge current can be adequately dissipated through the cell walls and the cell's temperature is not high enough to cause serious damage to the battery. The adverse affect of this method is that it takes many hours (e.g. 20) to recharge the cells to 100% state of charge (SOC). Another problem is that in some climates, the self-discharge rate may be higher than the charge rate from the charger. This results in a no-charging condition or where the battery(s) charges to a finite percentage below 100% SOC or even discharges to zero % SOC.

To cause a faster recharge time, some "fast" chargers are available which inject higher current, but the charge period is terminated by either user intervention (as required by user manuals, quoting "before permanent damage to the battery(s) is incurred.") or by a timer measuring a fixed time interval from the start of charge. In either case, more times than not, the battery(s) is either left charging too long or too short resulting in damaged or undercharged battery(s).

A more sophisticated approach used by higher cost systems is to inject charge at a higher rate, but stop the high-rate charge automatically after an end-of-charge indication is sensed. In NiMH and NiCd batteries, as the 100% SOC charge condition is approached, the temperature and terminal voltage rise rapidly. Therefore, the end-of-charge condition can be sensed by the charger measuring the battery(s) terminal voltage(s), the rate of change of terminal voltage or temperature levels. However, voltage and temperature levels and their rates of change are determined by not only the battery's state of charge but the ambient temperature and charge rates as well. The higher the rate of charge and ambient temperature, the higher the battery's case temperature and its terminal voltage will be at any state of charge. It becomes a daunting task to program a smart charger to take into account all of the environmental and forcing functions to determine the proper 100% SOC point and terminate fast charge for optimum battery performance.

The use of UPS systems having battery backup systems to provide regulated, uninterruptible power for such equipment as computer systems is well known. Typically, most UPS systems use some type of lead acid battery to provide backup power. Lead batteries, however, have performance limitations especially when they are discharged at rates well above their specification rates or when they are operated at temperature extremes. NiMH and NiCd battery chemistries provide advantages when used in UPS systems, detailed below.

While the invention is disclosed as being useful in the charging of NiMH and NiCd batteries in a UPS system, it is understood that it may be used in many other environments, for example, as a standalone charging device or used in other equipment and devices which contain such batteries would periodically require recharging.

SUMMARY OF THE INVENTION

It is desirable to have a method of charging a NiMH or NiCd battery such that charging does not occupy a substantial amount of time and such that the overall operating temperature of the battery during use and especially charging is reduced during the lifetime of the battery, thereby extending the life of the battery. This invention is directed to a method of charging that is accomplished using a temperature differential method to continuously regulate the rate of charge injected into the battery. An amplifier is used to amplify the detected or sensed difference in temperature between the one or more cases in which the battery or batteries are contained and ambient temperature. In this method, the greater the difference in temperature, the lower the charging current is injected into the battery.

In one general aspect, the invention features a power supply system including a power input to receive input power from a power source, a power output to provide output power to the battery(s), at least one NiMH or NiCd battery, a charger coupled to the power input and the battery to convert input power and output it in a regulated manner to the battery, a controller, coupled to the charger, constructed and arranged to monitor and control the power from the charger into the battery.

In general, in another aspect, the invention is directed to a method of charging a battery. The method of charging comprises detecting at least one battery, sensing a first temperature at a point proximal to the battery, sensing a second temperature at a point distal to the battery, and controlling current into the battery according to a difference between the first temperature and the second temperature. The invention provides one or more of the following advantages. The charging method of the invention improves the electrical efficiency of the charge process as the battery is charged to a 100% state of charge as quickly as the battery can accept charge. One hundred percent SOC is maintained in the battery without overheating the cells of the battery and by matching the rate of self-discharge with changes based on the battery age and ambient conditions. The consistency of charge rates is increased without computations with a microprocessor or other digital means. Eliminating the need for microprocessors in chargers implementing the battery charging method reduces the cost associated with a charger. Further, charging batteries according to the method of the invention increases safety by reducing a dependency on complex algorithms using voltage, temperature, and/or rate of charge of the batteries.

An uninterruptible power supply (USP) system used with the charging system of the present application includes one or more NiMH or NiCd batteries. NiMH and NiCd battery chemistries are desirable because they are respectively about 2 and 5 times volumetrically and gravimetrically more energy dense than an equivalent lead acid battery that is typically used in a UPS. Thus, the size of an NiMH or NiCd battery is much smaller and lighter than a similarly performing lead acid battery and makes the product into which it is installed more attractive, versatile and useful to customers. The extra volume required by similarly performing lead acid batteries typically requires extra floor space and costly hardware to install the batteries.

Another advantage of both NiMH and NiCd batteries is that they are relatively temperature immune. Their performance suffers little at the extremes of the lead acid limits, and their lifetime is not affected as dramatically by temperature as are lead acid batteries. It has been estimated that NiMH battery life times are around 10–15 years. Lead acid batteries can be designed to last similarly long, but compromise their energy density doing so.

The invention will be more fully understood after a review of the following figures, detailed description and claims.

BRIEF DESCRIPTION OF THE DRAWINGS

For a better understanding of the present invention, reference is made to the figures, which are incorporated herein by reference and in which:

FIG. 5 is a graph illustrating the relationship between current and temperature in the present invention.

DETAILED DESCRIPTION OF PREFERRED EMBODIMENTS

One embodiment of the present invention is directed to a system that includes one or more NiMH or NiCd batteries and a method for charging such batteries. An embodiment of the invention provides a method of determining the rate at which to charge a battery using a temperature differential, rather than an absolute temperature, absolute voltage, or rates thereof to determine rate of charge. Other embodiments are within the scope of the invention.

Figure 1:
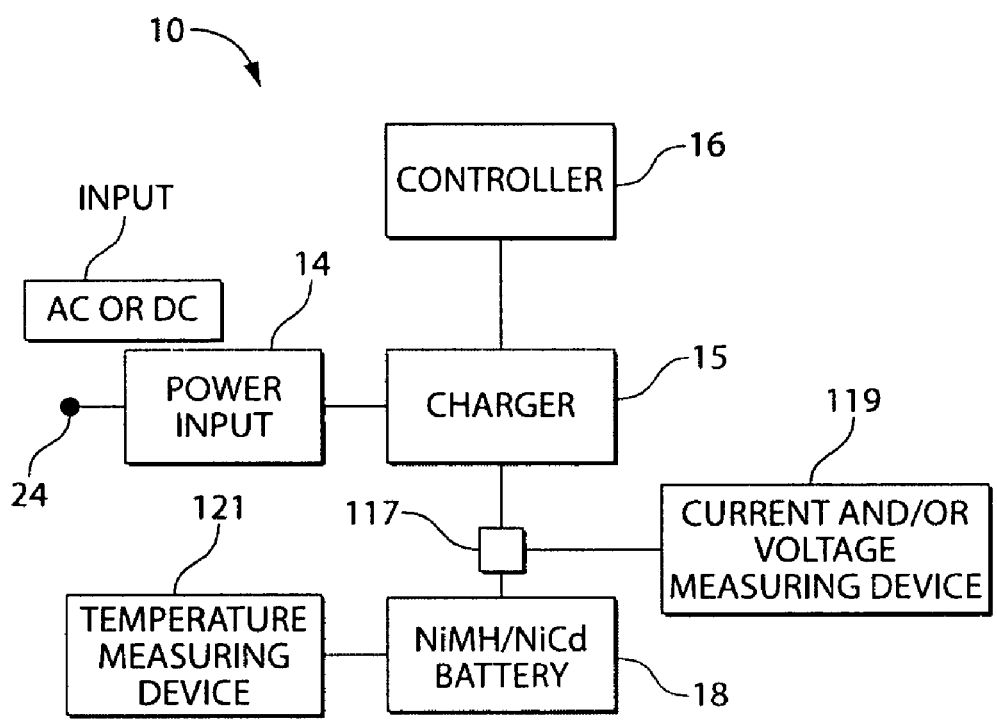
FIG. 1 is a block diagram of a system having a NiMH or a NiCd battery in accordance with one embodiment of the invention.

FIG. 1 shows an exemplary system 10 used to provide battery power in which a NiMH or NiCd battery can be used. The system 10 includes a power input 14, a charger 15, a controller 16, and a NiMH or NiCd battery 18. The power input 14 can include, for example, a circuit breaker or other current-limiting device, and/or a filter and/or a rectifier. The charger 15 can include, for example, one or more power-control switch(es), which are controlled by the controller 16.

The system can also include a current meter 119 or other current measuring means to measure a current of the battery, such as, for example, an ammeter, a Hall-effect sensor device or a voltmeter 119 that measures the voltage across a current shunt 117, and a temperature measuring device 121.

The exemplary system 10 can operate as follows. The circuit breaker/filter 112 receives input AC or DC power from the power source through the input 14, filters the input power and provides filtered power to the charger 15. The charger converts the filtered power to DC power having a predefined voltage value depending on the number and type of batteries being charged and at a current rate specified by the controller 16 and charge battery or batteries 18. It is understood by those skilled in the art that the system 10 may be incorporated into known UPS systems to provide a charging system for one or more NiMH or NiCd batteries incorporated into such UPS systems.

Regardless of the size or kind of battery being charged, the temperature differential charging method achieves a substantially consistent and predictable battery reaction. The temperature differential charging method controls the charging current of a battery by measuring the heat generated inside the battery and controlling the current into the battery based on the measured heat. Current is regulated between zero and a fixed maximum according to the inverse proportionality of the heat generated inside the battery. The heat is an indicator of the state of charge of the battery. Current is measured and controlled based on the heat, and the battery is maintained at 100% state of charge. Minimizing the battery's internal temperature, however, will prolong battery life. Thus, a control mechanism is employed to strike a balance between the heat generated and prolonged battery life.

The temperature differential charging method employs the principle that extra charge not contributing to a battery's state of charge is turned into heat. Even before 100% state of charge is reached, some of the current is turned into heat, while some is converted to stored energy. Additional current causes extra heat, which is not only wasteful, but is damaging to the battery. The optimal amount of charge current is enough to charge the battery to 100% or nearly so without heating it up. Therefore, the best way to determine the optimum rate of charge is to measure the amount of heat produced on the charging process and control the charge current to regulate an amount of waste heat to a predetermined and small level.

Figure 2:
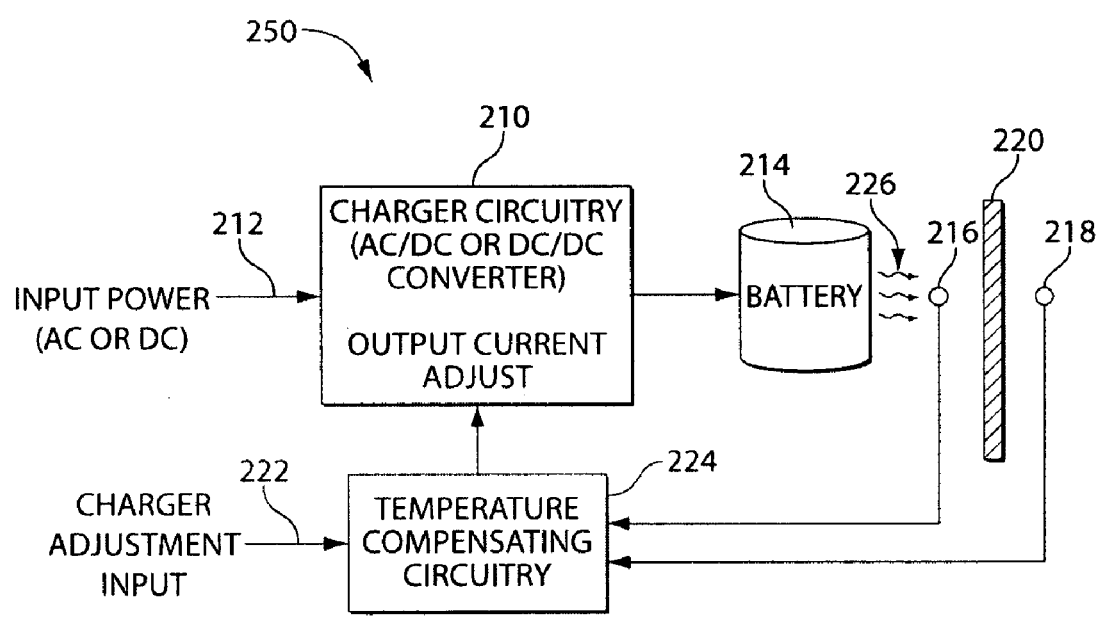
FIG. 2 is a diagram of a battery charging device for a battery in accordance with one embodiment of the invention.

The control mechanism of the present invention balances the heat generated and the life of the battery, discussed below, and does so by performing a heat flow measurement. Referring to FIG. 2, placement of temperature sensors to determine heat flow from a battery is shown. A battery charger 250 with temperature compensating function includes charger circuitry of a known type 210, a power (AC or DC) input 212, a battery 214, a first temperature sensor 216, a second temperature sensor 218, a thermal insulator 220, charger adjustment input 222, and temperature compensating circuitry 224. Charger power converters having the charging circuitry 210 can be of any known type to convert the input power 212 to inject current into the battery 214 for the purpose of maintaining the battery at full charge. The charger circuitry 210 can also control the output current based on input from the battery terminal voltage and the output current adjustment from the temperature compensating circuitry 224. The temperature compensating circuitry 224 can adjust the charger circuitry 210 output current based on the battery temperature measured at the first temperature sensor 216, and ambient temperature measured at the second temperature sensor 218, and the charger adjustment input 222. The first sensor 216 may be attached by suitable means (not shown) directly onto the battery case of the battery to sense the battery temperature, or may be spaced from but remain close to the battery case. The second sensor 218 is preferably located some distance from the battery case 214 so that the second sensor is relatively unaffected by the heat of the battery and can more accurately measure ambient temperature.

The battery can be any series or parallel combination of NiCAD or NiMH batteries. The input power can be AC or DC of any voltage. The charger adjustment input can be from any analog adjustment such as a manually or automatically set potentiometer or voltage source, programmable resistance, microprocessor-controlled signals, or any other of a number of known ways to provide overriding adjustment to the output charging current. The charger adjustment input allows for calibration of the output current to compensate for circuit parameter variations.

The first and second temperature sensors 216 and 218 can be temperature sensitive resistors, diodes, thermocouples, or any other device whose parameter(s) change with temperature. The thermal insulator 220 can be a plastic insulator, a gap of air, a glass mat, paper, or any other thermal barrier that allows a temperature differential to exist between the first sensor 216 and the second sensor 218 when a net thermal energy is dissipated by the battery, shown by arrows 226. Thus, the thermal insulator may be designed such that it isolates second sensor 218 from the heat 226 emanating from the battery 214.

Figure 3:
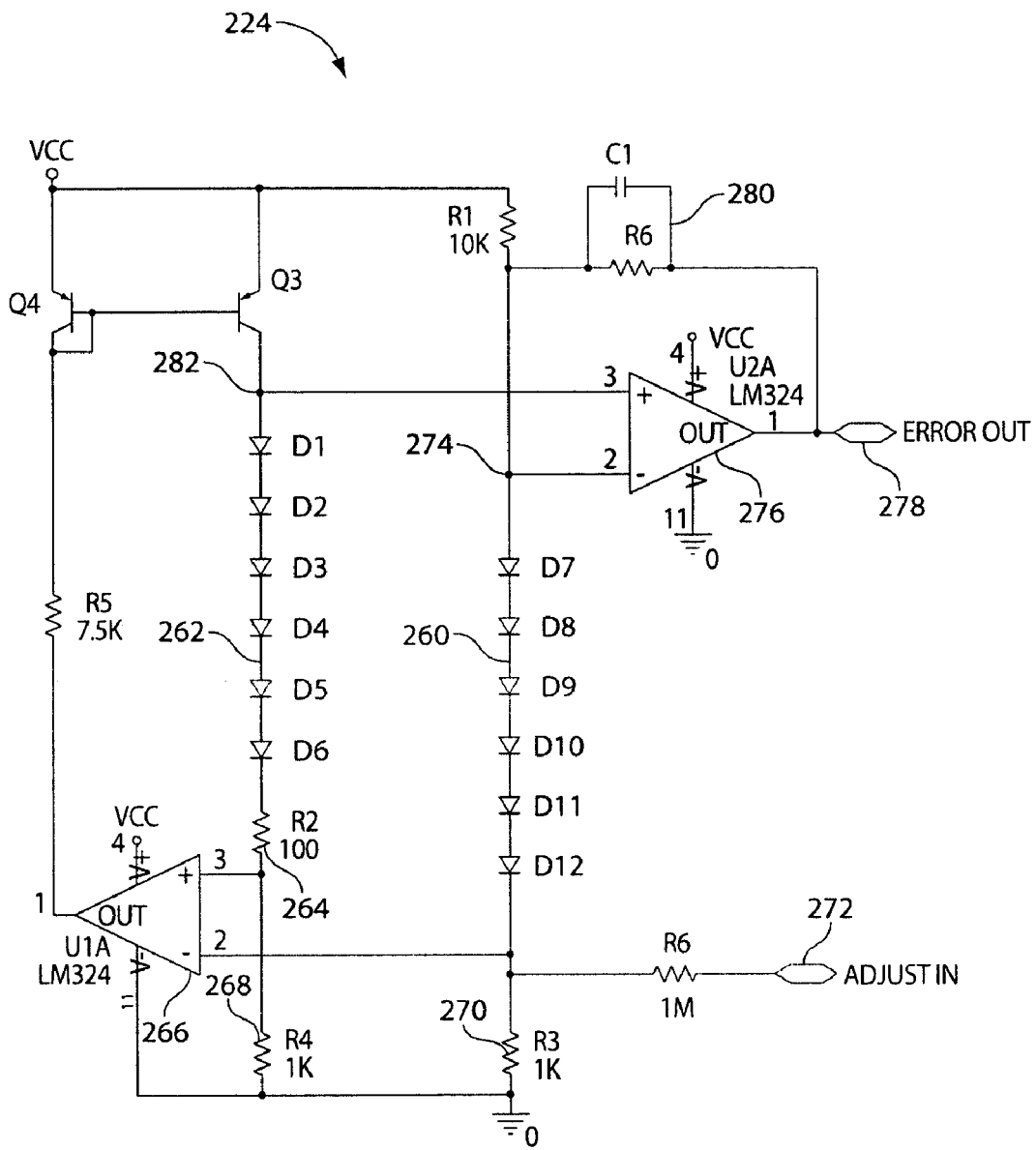
FIG. 3 is a temperature compensating circuit in accordance with one embodiment of the invention.

In FIG. 3, an exemplary temperature compensating circuit 224 is shown in more detail. The temperature compensating circuit includes diode strings 260 and 262. The voltage of a diode decreases with increasing temperature. Thus, the voltage at point 282 decreases when the temperature around diode string 262 increases. A decreasing voltage at junction 282 causes the output voltage at output 278 to decrease, thereby decreasing the charger current output. If diode string 262 is placed near the battery when the battery starts to warm up near the end of a charge cycle, the charge current will decrease. The decreasing charge current will reduce the temperature of the battery and the charge current will stabilize at a point in which a nominal amount of heat is generated inside the battery due to a small amount of excess current going into the battery.

A resistor 264 creates a small offset in the voltage between points 282 and 274 which allows the temperature of the diode string 262 to be slightly higher than that of the diode string 260 to ensure that there is always some charging current even when the battery is fully charged. An op-amp 266 balances the current between diode strings 262 and 260. Feedback elements 280 compensate the overall control loop to maintain stability. An adjust-in input 272 adjusts offsets due to parametric variations in the op-amp 266 and in op-amp 276, resistors 268 and 270, and the current/voltage relationship between diode strings 260 and 262.

An error-out signal 278 connects to the output current adjust of the charger circuitry 210, shown in FIG. 2. The polarity of this signal can be modified to suit any standard required by the charger circuitry 210. For example, a higher voltage at the error output 278 equates to a request for more current into the battery. Switching the inputs to the op-amp 266, however, will cause the reverse to occur, i.e., lower voltage on output 278 causes the charger current to increase. The selection of signal polarity and level is arbitrary and not part of the novelty of the invention.

The diode strings 260 and 262 are temperature sensors in that their respective current/voltage relationships change with temperature. Any temperature sensitive device can be used. Depending on the polarity of the temperature dependency, the input op-amp 276 can be reversed in order to properly compensate for a temperature differential. If the battery temperature increases, the error output signal 278 increases such that the charger current is reduced.

In the temperature compensating circuit of FIG. 3, a plurality of temperature sensors in diode string 262 indicate a plurality of batteries whose temperatures are being sensed. In other embodiments, however, a lesser number of temperature sensors are used than there are batteries. Further, an equal number of temperature sensors are included in string diode 260. String diode 260 measures ambient temperature so that a differential temperature measurement can be achieved. In other embodiments, the ambient temperature is measured using any other known means, for example, a single diode drop can be amplified a number of times by an amplifier stage. Other temperature dependent elements are suitable, including but not limited to, thermistors and thermocouples.

The control mechanism works according to an algorithm. Referring again to FIG. 2, to achieve an appropriate level of charge for the battery, a heat flow measurement from the battery is taken. As heat is generated in the battery, heat flows from the battery to the ambient at a rate shown by arrows 226 and defined as $P_{diss}$. This is called the energy dissipation rate. Heat will flow through all barriers and cause the temperatures closer to the battery to be higher than those further away. The higher the thermal resistance of the barriers in the path of this heat, the higher the temperature differential will be across the barrier. The relationship between $\Delta T$ and $P_{diss}$ is:

$$\Delta T = P_{diss} \times Z_{th} \qquad (1)$$

The greater the thermal resistance, $Z_{th}$, the greater the temperature differential for any given energy dissipation rate.

Figure 4:
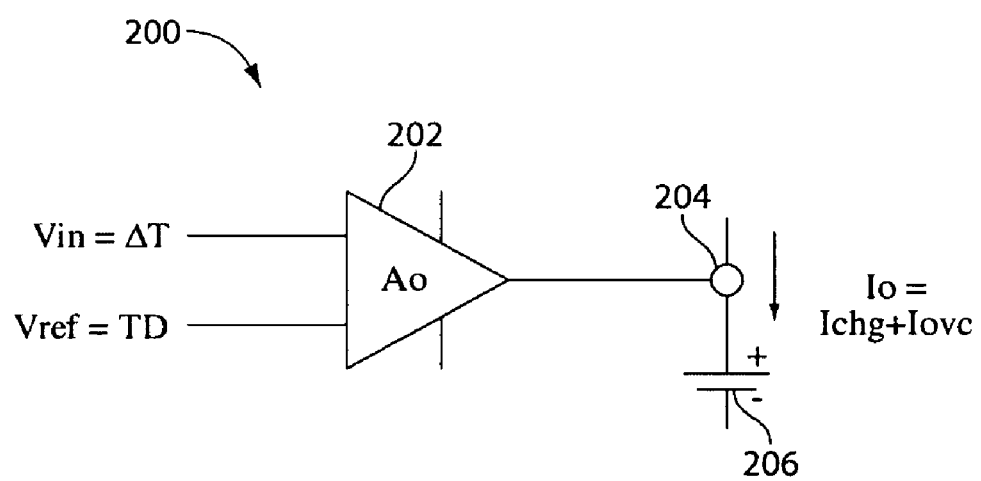
FIG. 4 is a diagram showing an amplifier used in the charging control mechanism in accordance with one embodiment of the invention.

An amplifier used in the control mechanism for charging the battery and discussed in detail with respect to FIG. 3, is shown in FIG. 4 for simplicity. Referring to FIG. 4, the control mechanism 200 includes an amplifier 202 with a high gain, Ao (>100,000), a current regulator 204 and a battery 206 to be charged. A signal input into the amplifier 202, $\Delta T$, is a signal of the magnitude of the difference in temperatures T1 and T2 between the battery case and that of a spot somewhere between the battery and ambient, and is obtained from the apparatus shown in FIG. 3. The other signal into the amplifier is a reference signal, Td, representative of the ideal $\Delta T$ to maintain between the spots where the temperature is measured. The relationship between the charge current Io, Td and $\Delta T$ are shown in FIG. 5.

Graph 1 shows that the higher $\Delta T$ is, the lower the charging current. The lower the $\Delta T$ is, the higher the charging current until a maximum level fixed by either the natural upper capabilities of the charger, or by an artificial limit imposed by design to protect the batteries if necessary. The slope of the transition from full charging current to minimum charging current is set by the open loop gain of the amplifier in FIG. 4, Ao. On the slope between the minimum and maximum levels, the relationship between Io, Td and $\Delta T$ is:

$$Io = Ao \times (Td - \Delta T) \qquad (2)$$

When the charger outputs current into the battery, there are two components of this current. The current that is directly converted to stored chemical energy is represented by Ichg. The current not converted to chemical energy contributing to a peripheral reaction that generates waste heat is represented by Iovc.

When the battery is depleted, almost all of the current is Ichg (even when empty, some of the current does not turn into chemical energy causing Iovc to never be zero). When the battery is fully charged, almost all of the current is Iovc (some internal self discharge happens which causes Ichg to never go to zero). But in any state, $$Io = Ichg + Iovc \quad (3)$$

Inside the battery there are two mechanisms that generate heat. "Friction" heat generated by electrons (electrical current) bumping into metallic atoms is a first mechanism. This heat is quantified by:

$$Io^2 \times Rs, \quad (4)$$

where Io is the total charging current, and Rs is the electrical resistance of the conductors in the battery.

The second mechanism, reaction heat generated by a peripheral electrochemical reaction due to excess electrons, is quantified by:

$$Iovc \times Vb, \quad (5)$$

where Vb is the battery terminal voltage.

The total energy dissipation rate from the battery is the sum of these two quantities:

$$Pdiss = (Io^2 \times Rs) + (Iovc \times Vb) \quad (6)$$

Combining equation (6) with equation (1) above and solving for ΔT results in $$\Delta T = (Io^2 \times Rs \times Zth) + (Iovc \times Vb \times Zth) \quad (7)$$

This is a relationship between the charging current, battery parameters and the measured temperature differential at the two probes.

Control Loop Equations

To find the output current to which the control mechanism will regulate based on the ΔT measured, ΔT is substituted from equation (7) into equation (2) to produce:

$$Io = Ao \times [Td - (Io^2 \times Rs \times Zth) - (Iovc \times Vb \times Zth)] \quad (8)$$

Io, appearing on both sides of the equation, is a function of itself. This is a relationship of a control system with feedback.

The amplifier in FIG. 4 has a very high gain, Ao. Thus, the right side of equation (8) is so much higher than the left that the left side can be approximated as zero. For example, a practical value of charge current may be 1 Amp in a fast charger. Dividing both sides, by Ao (>100,000) the left side is a very small number (1/100,000) and the right side is a number much closer to one. Therefore, if Ao is very large as it is in a practical amplifier circuit, equation (8) can be closely approximated by:

$$0 = Td - (Io^2 \times Rs \times Zth) - (Iovc \times Vb \times Zth) \quad (9)$$

Solving for Td shows that Td has two components:

$$Td = (Io^2 \times Rs \times Zth) + (Iovc \times Vb \times Zth) \quad (10)$$

The first term, Td, is the component due to the total current passing though resistance Rs electrically causing heat and the second term is the component due to the excessive charge current chemically causing heat.

Controlling the Charge Current During the Entire Recharge Cycle

Throughout the charging cycle from depleted to full, the charging currents vary and the contributions to the heat generation switch from mostly electrical to mostly electrochemical. The simple circuits in FIGS. 2–4 maintain a temperature differential across the two temperature probes by controlling the total current fed into the battery. The higher the temperature differential, the more that the control circuit throttles back on the current. So, whether the heat generated from internal $Io^2Rs$ losses, or from electrochemical reactions, the total energy dissipated is maintained constant regardless of the state of charge of the battery.

When the battery is depleted, the overcharge current Iocv is very low, so the dominant factor in terms of the heat generations is the first term of equation (10) because the second term is reduced to a small number:

$$Td = (Io^2 \times Rs \times Zth) \quad (11)$$

Solving for Io yields:

$$Io = \sqrt{\frac{Td}{Rs \times Zth}} \quad (12)$$

In equation (12), Io is the total charging current when the battery is fully discharged.

As the battery becomes more charged, Iovc starts to increase and Ichg begins to drop to near zero. This is a naturally occurring phenomenon in the battery during the course of the recharge cycle. Toward the end of the recharge cycle and beyond, the dominant factor in heat generation is the second term of equation (10):

$$Td = (Iocv \times Vb \times Zth) \quad (13)$$

Solving for Iocv produces the relationship:

$$Iocv = \frac{Td}{Vb \times Zth} \quad (14)$$

In equation (14), Iocv is the overcharge current producing waste heat in the battery.

Ichg at the end of the charge cycle is very small but equal to the self-discharge rate of the battery. It is not insignificant compared to Iovc. The total current into the battery Io is found by adding these two terms.

In a battery, electrons leak from one electrode to the other and the battery discharges itself internally. Some batteries leak more than others and this leakage rate is proportional to the battery temperature and other factors. To compensate for this effect, some chargers fix a small amount of current to balance this effect. Too much current causes excessive electrons to produce heat-generating chemical reaction, while too little will allow the battery to discharge below 100% state-of-charge. Maintaining 100% state-of-charge of a fully charged battery is commonly called "float charging."

It is known that excessive current causes heat, and thus the optimal float charging current can be achieved by regulating the heat flow from the battery to a minimal level. The heat flow can be detected by a temperature differential across two probes as shown in FIG. 3. If a zero temperature differential is detected, the battery is not being charged. If too high a temperature differential is detected, the battery is being charged too much. Finding the balance is key to keeping the battery at 100% state of charge vs. overheating the battery, which causes its service life to be shortened.

The control circuit is to reduce Iocv to such a level that the internal temperatures are as close to ambient as possible. This value is set by fixing the control reference signal, Td, in FIG. 4. A value for Td that is too small will reduce the charging current when the battery is empty, which would cause the battery to take too long to charge from a fully discharged state.

EXAMPLE

By way of example if,

Vb is 1.5V (typical for one cell),

Rs is 0.1 Ω (typical of a small battery size),

Zth is 10° C./Watt (a function of the placement of the probes)

Set Td to 0.2° C. (by controlling the reference voltage to the amplifier).

To determine the steady-state overcharge charge maintenance current, use equation (14):

$$Iocv = \frac{Td}{Vb \times Zth} = 13 \text{ mA} \quad (14)$$

and according to equation (6), $$P\text{diss} = (Io^2 \times Rs) + (Iocv \times Vb) = 20 \text{ mW} \quad (6)$$

20 mW of heat is generated by the excessive charge current in the battery during the float charging mode. This is a small and manageable amount of heat resulting in only a 0.2° C. rise in the battery above ambient.

To determine the full charging current at the beginning of the charge cycle, use (12):

$$Io = \sqrt{\frac{Td}{Rs \times Zth}} = 0.45 \text{ A} \quad (12)$$

and the internal Pdiss is also, $$P\text{diss} = (Io^2 \times Rs) + (Iocv \times Vb) = 20 \text{ mW} \quad (6)$$

By fixing the measured temperature differential, ΔT, to Td, the internal energy dissipation rate is held to a fixed value no matter what the battery's state of charge. 0.45A will charge a 2 amp-hour battery in approximately 4 hours.

Thus, in order to maximize service life of a battery, a minimum temperature is desired. In order to maintain 100% state of charge, however, some level of charge maintenance current is required. Since it is known that the charge current not contributing to state-of-charge maintenance is converted to heat, a simple and reliable charging method is to govern the charge current based on a measure of heat emanating from the battery. It is shown that the same mechanism to control float charging can be used to control recharge current and achieve relatively short recharge times of completely discharged batteries.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of charging a battery comprising:
   providing at least one of a Nickel Metal Hydride battery or a Nickel Cadmium battery;
   sensing a first temperature at a point proximal to the at least one Nickel Metal Hydride battery or the Nickel Cadmium battery;
   sensing a second temperature at a point distal to the battery; and
   controlling a charging current by increasing or decreasing a flow of the charging current into the battery according to a difference between the first temperature and the second temperature.

2. The method of claim 1, wherein the at least one battery is incorporated into an uninterruptible power supply.

* * * * *